April 18, 1939. T. G. BEAMENT 2,155,215
METHOD OF PRODUCING COMPOSITE WEAR-RESISTING BODIES
Filed Feb. 17, 1936
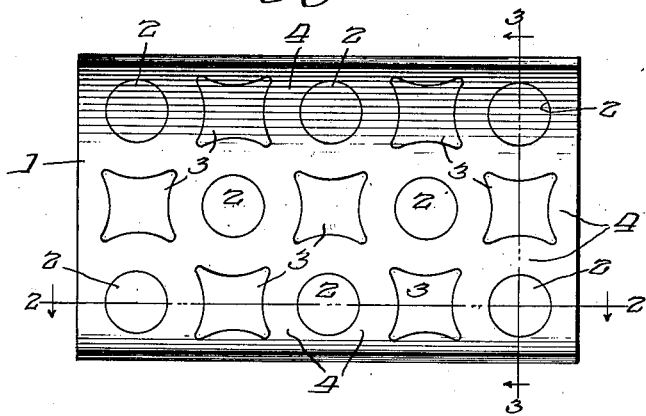
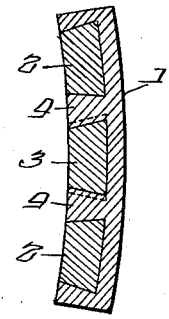
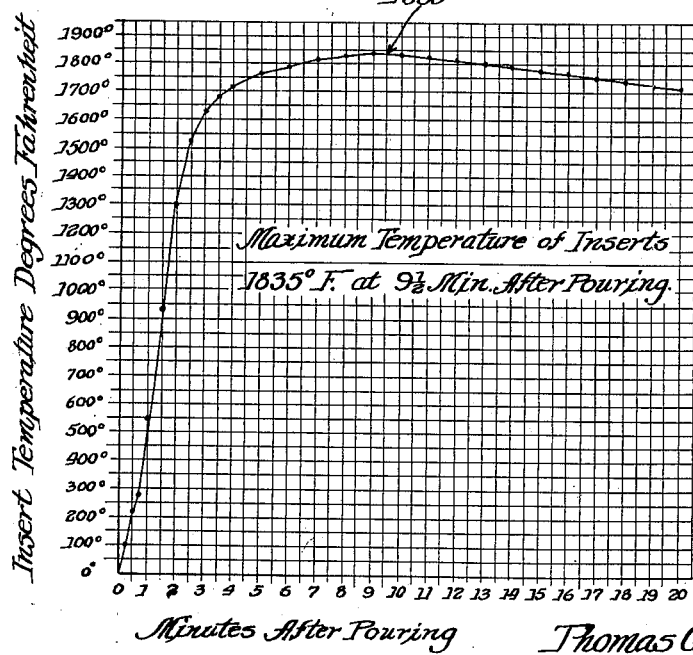
Inventor:
Thomas Geoffrey Beament
By Wilkinson, Huxley, Byron & Knight
Attys.

Patented Apr. 18, 1939

2,155,215

UNITED STATES PATENT OFFICE 2,155,215

METHOD OF PRODUCING COMPOSITE WEAR-RESISTING BODIES

Thomas Geoffrey Beament, Orillia, Ontario, Canada

Application February 17, 1936, Serial No. 64,238

11 Claims.   (Cl. 148—3)

This invention relates to composite metal objects or objects which, for the sake of rendering them highly wear-resistant without impairing their capacity to withstand shocks and other physical stresses, are formed by casting a relatively strong and tough metal body around a desired number of preformed, highly wear-resistant and suitably spaced inserts.

The present invention, on the one hand, relates to a new article of manufacture characterized by the selection for the body member and inserts, respectively, of metals, alloys or classes of metal having physical properties which cause them, when assembled in accordance with the invention, to enter into a new cooperative relationship productive of service efficiency and lasting qualities superior to those of previously known composite wear-resisting objects; and, on the other hand, more particularly resides in a new method of producing the composite object, such method being characterized by a novel distribution of areas between the inserts and the body in which they are embedded, or a novel proportioning of the masses of the individual inserts to the mass of the body metal surrounding and spacing them apart, and the resultant capacity of heat transfer between these members of the composite object in the original casting of the body about the inserts as well as in subsequent heat treatment; a novel subjection of both of the metals, alloys or classes of metal, respectively constituent of the inserts and the body, after their assembly and therefore simultaneously, to a heat treatment which affects them differently and brings out in them those physical properties which enable them to enter into the novel cooperative relationship aforesaid.

In the accompanying drawing—

Figure 1 is a plan view of an abrasion-resistant body produced in accordance with the present invention.

Figure 2 is a section on the line 2—2 of Figure 1.

Figure 3 is a section on the line 3—3 of Figure 1, and

Figure 4 is a chrono-thermographic chart of temperatures developed in the herein-described alloy inserts when submerged in molten manganese steel poured into a mold in accordance with the present invention.

I represents a composite body designed to serve as a crushing member and rendered highly resistant to abrasion and of great structural integrity by application of the principles of the present invention. In said body, 2, 3, represent inserts made of the herein-described alloy having a high coefficiency of resistance to abrasion. These inserts are of two different designs, namely, of circular and quadrilateral section, respectively, alternated in positions in a manner to render substantially symmetrical the intervening embracing walls 4 of the body metal, which condition is enhanced by concaving the sides of the quadrilateral inserts.

As shown in Figures 2 and 3, inserts 2, 3, increase in transverse dimension inwardly in order that they may be countersunk in the body I, and with the result that the intervening walls 4 increase in thickness outwardly, thereby materially strengthening the sustention of the ends of the inserts where they merge with the working surface of the body and at the same time, by the high contractile force, the separating walls 4 are given a large inward moment which, exerted upon the pyramidal sides of the inserts, presses the latter firmly to a seating upon that portion of the metal body which underlies the inserts.

In producing objects under the present invention, the material of the wear-resistant inserts, 2, 3, is of such nature that the inserts can be best formed by casting. The high degree of wear-resistance required of them and their essentially lower coefficient of thermal contraction will generally limit the alloy or composition of the inserts to a range containing at least 1½% and preferably 3% carbon; at least .50% and not greater than 10% of a metal of the chromium group, preferably 2% chromium; with or without nickel; the nickel, if used, being in a proportion of at least 1% and not greater than 7%, and preferably 4%; and the remainder being essentially iron. Other constituents such as manganese, silicon, sulphur, phosphorus and the like, ordinarily found in castings, may be present in minor percentages without adding to or detracting substantially from the quality of the alloy employed for the inserts; and these constituents when present may be regarded as non-essentials. The body member I which must not only be tough and shock resistant but have a greater coefficient of thermal contraction than the inserts, is preferably made of iron with about 1½% carbon and about 13% manganese, although low carbon steel may be used with a measurable proportion of the advantages herein set forth.

An alloy falling within the ranges above outlined for the inserts does not possess its maximum potential resistance against wear if left in the condition in which it is cast, but requires a heat treatment comprising a secondary heating of the said alloy to a temperature above its critical point from which it may be cooled fairly rapidly. Surprisingly, treatment of the formed inserts, such, for instance, as heating them to 1850° F. followed by quenching in water, somewhat softens the high carbon alloy from which they are formed but renders it somewhat tougher than it was in the condition as cast, and at the same time very materially increases its resistance to wear. It has also been found that if the inserts made of an alloy such as above indicated be subjected to what is commonly termed "drawing", that is to say, reheated to a relatively lower temperature varying from 400° to 1200° F., or at least a temperature under the critical temperature of the alloy, for a period of from one to three hours depending on the drawing temperature, the hardness is increased materially and the resistance to wear is sometimes more than doubled and even tripled.

When an alloy of the above-described composition, obviously too fragile to permit of its use in producing the body of an object subjected to shock or impact in use, is to be subdivided into the relatively small inserts or units such as indicated at 2, 3, of Figs. 1, 2 and 3 of the accompanying drawing, and these units are to be mounted in a body member 1 made of the hereinin-identified tough, ductile manganese steel, the hard, brittle, wear-resistant alloy is first cast in the form of inserts; these inserts are then placed in a mold spaced one from another in a manner to insure between them masses of body material bearing a desired relationship to the mass of the inserts; the molten body material is then poured under conditions that will insure its flowing around and filling the spaces between the inserts and thereby developing heat transfer of a capacity determined by the volume of molten metal in said spaces, and which said volume, by predetermination of said spaces, is that which will raise the temperature of the inserts to a degree appropriate to the quenching in the heat treatment of the present invention before the poured metal has cooled below the temperature appropriate to its own quenching. Hence, when both components are subjected to one and the same quench, this quench will affect the two different alloys differently and cause them to enter into a new physical relationship which will lend superior qualities to the finished object. The quench will preferably be that conventionally used in the production of objects of manganese steel. It will be from an appropriate degree of heat remaining after the cast, for instance, about 1850° F., which temperature will have been imparted to the inserts by the poured enveloping steel and will also be approximately the temperature to which the poured metal has cooled after a few minutes of standing.

The advantageous effect of this simultaneous quenching from an appropriate heat of two different materials herein identified as entering into the composite structure, is that it bestows upon the respective materials physical properties that are quite distinct one from the other. It renders the body-forming material tough and ductile at the same time that it renders the inserts hard and brittle; the brittleness, however, being counterbalanced by the embrace of the inserts by the tough ductile material, which embrace is of a higher order than in previously known cast composite objects. This heat treatment will be still more effective if the composite object receives the further heat treatment of drawing from a temperature of 400° to 1200°— say, 600°—through a period of from one to three hours. The quenching is economical because it is from the casting heat and serves as well to produce the quenching indispensable to cast manganese steel. More than this, quenching from the heat supplied by the casting operation conditions the enveloping body metal for contracting upon the inserts and firmly gripping them without developing checks or cracks in the cooled casting; the high coefficient of thermal contraction in the embracing body metal, in cooling from its pouring heat and the high stresses of compression which it imposes upon the inserts renders impossible the loosening of the inserts in the enveloping body, greatly enhances the sustention of the inserts against spalling under forces encountered in use, and makes it possible to use for the inserts an alloy the brittleness of which, in the absence of such high compression, might render their use impracticable.

By way of illustration of the advantage of controlling heat transfer through the relative masses of the insert alloy and the enveloping body alloy of the composite article, to-wit, by selecting the spacing of properly shaped inserts in the mold, assume the introduction into a mold of one hundred pounds of alloy inserts so spaced as to admit between and around them two hundred pounds of molten steel at 3000° F., and that the mold be poured and permitted to stand until the heat has become equalized between the body and the inserts, the mean temperature of the composite mass will be found to stand at a point between 1800 and 1900° F. which may be just right for the quenching incident to the first heat treatment which the body and the inserts, jointly, are to receive. The proportion of body metal to insert metal should be such as, on the one hand, to prevent excessive heating of the inserts and, on the other hand, to insure sufficient heating as a preliminary to the quenching step in the heat treatment. In other words, the heat transfer from the molten metal to the inserts should be such as to leave a final temperature above the critical for the insert but below the fusion temperature thereof. Subject to these conditions, the percentage of insert mass may be varied between 25% and 75% of the entire mass of the composite object.

By way of further explanation, reference may be had to the chart appearing on the accompanying drawing and consisting of a time-temperature curve secured by inserting a thermocouple in an insert while in position in the mold and then taking the temperature readings at periods commencing immediately after molten manganese steel had been poured into the mold. This chart shows that the temperature was rapidly raised to around 1700°, then more slowly to 1850°; that it remained above 1700° for a period of around fifteen minutes; and that this proved ample to impart to the insert alloy the qualities required before quenching in the first heat treatment of the inserts.

From the foregoing, it will be seen that the present invention also contemplates the determining of the masses of the insert and body metals entering into the composite structure so that the ratio of the one mass to the other is such as will permit utilizing the heat of the poured body metal for bringing the initially cold inserts to a temperature appropriate for quenching purposes and without cooling the poured metal to a temperature below that appropriate to its own quenching; also, as corollary to this, the increasing or decreasing of the percentage of body metal to insert metal until the final temperature obtained in the mold is increased or decreased to the degree desired.

A simple and relatively inexpensive procedure within the broadest aspect of the invention, would be to make the inserts of a high carbon, high chromium alloy which is not substantially softened by heat treatment, then cast around these inserts a body mass of plain low carbon steel, then place the composite unit in service without heat treatment. The performance of such a unit will be substantially superior to that of known structures—a plain mass of manganese steel, for instance.

Among the particular fields of application to which the invention is highly appropriate and which will serve to illustrate its uses, are ore and other mineral grinding and crushing members, such as liners for ball mills or rod mills, wearing plates for jaw crushers, wearing portions of crushing rolls, skid plates, chutes and other apparatus subjected in use to abrasive action of non-metallic materials.

In addition to the very superior performance characteristics of an object produced in accordance with the present invention, for instance, a rock crushing member, the invention also affords a number of production advantages. In the production of cast manganese steel liner plates, for instance, the casting yield is usually not over 60% of the molten metal, due to the high shrinkage of heavy sections which must be fed as a solid body, whereas with this insert method of casting, especially when, as is preferred, the sectional areas of the inserts and of the intervening body metal are about equal, the chilling effect of the inserts and the dividing up of the body metal into thin walls surrounding the inserts produces the equivalent of relatively thin chilled-cast plates or bars, and the yield of acceptable metal bodies enveloping the new wear-resisting members will usually be as high as 90%. When the cost of melting wastage and the like is considered, the saving afforded by the present invention becomes quite evident. Due to the cooling effect of the inserts also, there is no fusing and cutting of the mold material as always occurs when these units are cast in one heavy piece; hence, cleaning costs are substantially reduced.

Another advantage of using inserts in manganese steel in accordance with the present invention relates to their effect upon overall pattern shrinkage. In the production of some articles—rod mill liners, for instance—shrinkage of straight manganese steel is about $\frac{5}{16}$ of an inch per foot, whereas in the inserts construction the overall shrinkage is only about $\frac{3}{16}$ of an inch per foot.

In the making of heavy liner plates, jaw crusher parts, and the like, it is standard practice to employ dry sand molds, that is, molds of relatively expensive composition, which are baked at an additional cost in ovens until they are thoroughly dry and hard. With this insert practice, ordinary green sand molds can be used with additional saving in time and money. Furthermore, when any metal or alloy is made into castings of large cross section and heavy massive areas, there is quite a serious and harmful segregation of constituents, with large grain size and general interior metallographic orientation of the metal which militates against the highest service. By filling the mold partly full of cold metal bodies and then casting the body metal into thin chilled layers approximating in thickness that of the inserts, the metal of the supporting body becomes very fine grained, tough in condition, and generally superior to the same metal poured with heavy cross section.

In these several applications of the invention, the inserts should be practically surrounded on all but the working surface and with a minimum thickness of tough body metal behind the inserts, so that when the inserts are practically worn away there will be no breaking up of the object as a whole. It is desirable to avoid sharp corners so as not to weaken the body metal more than necessary, and while a section through the wearing plate parallel to the working surface might present almost any mosaic arrangement of the insert and body metal, it is desirable to stagger the confines of the inserts, for instance, by selecting designs such as illustrated on the drawing, to prevent continuity of planes of weakness. In this connection, it will be noted that the designs of inserts are such that their masses are symmetrically distributed about their centers rather than forming elongated polygons or the like.

The use of corrosion resistant alloy for the inserts has special advantages. I have found that a large portion of the loss on wearing surfaces ordinarily ascribed to wear is due to corrosion. Ordinary steels, for instance, rust very rapidly, and particularly when the surface film is in very unstable condition due to severe cold working of the surface itself, by the ore being ground, or by grinding elements—balls, for instance. During the actual operation of wet crushing, for example, the surfaces of wear-resisting members rapidly rusted and progressively and repeatedly wiped off by the abrasives, may, because of their continued bright appearance, seem not to corrode, but the fact is that the losses through corrosion are large. Therefore, of two metals having the same degree of hardness or wearing resistance, the one possessing the greatest resistance to corrosion will bestow longer operating life. The composite body of the present invention affords the advantage that the high carbon chromium containing alloy has greater resistance to corrosion than low carbon steel or manganese steel, and for this reason gives longer life under conditions where progressive rust or corrosion is a factor.

I claim:

1. In the art of producing composite metal objects by pouring a molten body component into enveloping relation to insert components, that improvement which consists in positioning a group of the insert components aggregating a predetermined mass in a manner to leave among them body component receiving spaces aggregating a relative mass which, at the pouring temperature of the said body component, will equalize the temperature of both components at a degree that is above the critical temperature of both of them, and then subjecting both components of the object to quenching as a single structure.

2. The method described in claim 1, in which the body component consists of metal having a materially higher thermal contraction than the metal of the insert components, and is such that the quenching raises the tensile strength of the insert-enveloping walls of the body component against fracture under the high stresses of tension left therein by the cooling.

3. The method described in claim 1, in which the metal of the body component is one that is rendered ductile by the quenching and the metal of the insert components is a relatively harder metal, so that while cooling of the composite object sets up high stresses of compression in the insert components and high stresses of tension in the surrounding walls of the body component, the walls of the body component will yield before rupturing under such stresses.

4. The method described in claim 1, in which the insert components consist in a highly wear-resistant brittle metal, and the body component consists of metal having a materially higher thermal contraction which, on the cooling of both components, maintains upon the insert components a high degree of enveloping pressure.

5. The method described in claim 1, in which the quenching of the both components of the object, is followed by a further heat treatment consisting of drawing the object at a temperature below the critical of both components.

6. The method of producing composite metal objects composed of a plurality of metallic inserts of predetermined characteristics enveloped by a metallic body of different characteristics which comprises positioning a group of the solid metallic inserts aggregating a predetermined mass with spaces therebetween for receiving a predetermined mass of the metallic body, pouring the molten metallic body into said spaces at a temperature which will be equalized with that of the solid metallic inserts at a degree which is above the critical temperature of said inserts and said body, and cooling the composite object as a single structure by quenching.

7. The method of producing composite metal objects composed of a plurality of metallic inserts of predetermined characteristics enveloped by a metallic body of different characteristics which comprises positioning a group of the solid metallic inserts aggregating a predetermined mass with spaces therebetween for receiving a predetermined mass of the metallic body, pouring the molten metallic body into said spaces at a temperature which will be equalized with that of the solid metallic inserts at a degree which is above the critical temperature of said inserts and said body, cooling the composite object as a single structure by quenching, and heat treating the composite object by "drawing".

8. The method of producing composite metal objects composed of a plurality of metallic inserts of predetermined characteristics enveloped by a metallic body of different characteristics which comprises positioning a group of the solid metallic inserts aggregating a predetermined mass with spaces therebetween for receiving a predetermined mass of the metallic body, pouring the molten metallic body into said spaces at a temperature which will be equalized with that of the solid metallic inserts at a degree which is above the critical temperature of said inserts and said body, cooling the composite object as a single structure by quenching, and reheating the composite object to a temperature below the critical temperature of the constituents of the composite object ranging from 400° to 1200° F. for a period of from one to three hours.

9. The method of producing composite metal objects composed of a plurality of cast wear-resistant metallic inserts embedded in a tough and shock-resistant metallic body having a greater thermal coefficient of contraction than said inserts which comprises positioning a group of the solid metallic inserts aggregating a predetermined mass with spaces therebetween for receiving a predetermined mass of the metallic body, pouring the molten metallic body into said spaces at a temperature which will be equalized with that of the cast solid metallic inserts at a degree below the melting point of said inserts but above the critical temperature of said inserts and said body, cooling the composite object as a single structure by quenching, and reheating the composite object for a "drawing" treatment to develop the desired proporties in each of the constituents.

10. The method set forth in claim 9 wherein the cast metallic inserts are formed from an alloy containing from 1½% to 3% carbon, 0.50% to 10% of metal from the chromium group, the remainder being essentially iron; and the surrounding metallic body is formed of a manganese steel.

11. The method set forth in claim 9 wherein the cast metallic inserts are formed from an alloy containing from 1½% to 3% carbon, 0.50% to 10% of metal from the chromium group, 1% to 7% nickel, the remainder being essentially iron; and the surrounding metallic body is formed of an iron alloy containing about 1½% carbon and 13% manganese.

T. G. BEAMENT.